(12) United States Patent
Courbat et al.

(10) Patent No.: US 11,140,923 B2
(45) Date of Patent: Oct. 12, 2021

(54) INDUCTIVE HEATING ARRANGEMENT COMPRISING A TEMPERATURE SENSOR

(71) Applicant: Philip Morris Products S.A., Neuchatel (CH)

(72) Inventors: Jerome Christian Courbat, Neuchatel (CH); Oleg Mironov, Neuchatel (CH); Enrico Stura, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 17/259,618

(22) PCT Filed: Jun. 25, 2020

(86) PCT No.: PCT/EP2020/067932
§ 371 (c)(1),
(2) Date: Jan. 12, 2021

(87) PCT Pub. No.: WO2021/001266
PCT Pub. Date: Jan. 7, 2021

(65) Prior Publication Data
US 2021/0244103 A1    Aug. 12, 2021

(30) Foreign Application Priority Data
Jul. 4, 2019   (EP) ..................................... 19184512

(51) Int. Cl.
*G01K 7/00* (2006.01)
*G01K 1/00* (2006.01)
(Continued)

(52) U.S. Cl.
CPC .............. *A24F 40/51* (2020.01); *A24F 40/20* (2020.01); *A24F 40/465* (2020.01); *G01K 1/026* (2013.01);
(Continued)

(58) Field of Classification Search
USPC .......................... 374/179, 208, 183, 141, 166
See application file for complete search history.

(56) References Cited

U.S. PATENT DOCUMENTS

2016/0150825 A1*  6/2016  Mironov ............... A24F 40/465
                                                    219/634
2017/0055583 A1   3/2017  Blandino et al.
(Continued)

FOREIGN PATENT DOCUMENTS

KR   10-2019-0047092   5/2019
KR   10-2019-0049391   5/2019
(Continued)

OTHER PUBLICATIONS

International Search Report and Written Opinion dated Sep. 29, 2020 in PCT/EP2020/067932 filed on Jun. 25, 2020.
(Continued)

*Primary Examiner* — Mirellys Jagan
(74) *Attorney, Agent, or Firm* — Oblon, McClelland, Maier & Neustadt, L.L.P.

(57) ABSTRACT

A method is provided for measuring a temperature of a susceptor of an inductive heating arrangement configured to heat an aerosol-forming substrate, the inductive heating arrangement including: a cavity to receive the substrate, at least one inductor coil configured to generate a varying magnetic field when a varying electric current flows through the at least one inductor coil, at least one susceptor arranged relative to the at least one inductor coil such that the at least one susceptor is heatable by penetration of the varying magnetic field, the at least one susceptor being configured to heat the substrate, and at least one temperature sensor; and the method including: providing the at least one temperature sensor in thermal contact with the at least one susceptor, and measuring the temperature of the at least one susceptor when
(Continued)

Figure 1:
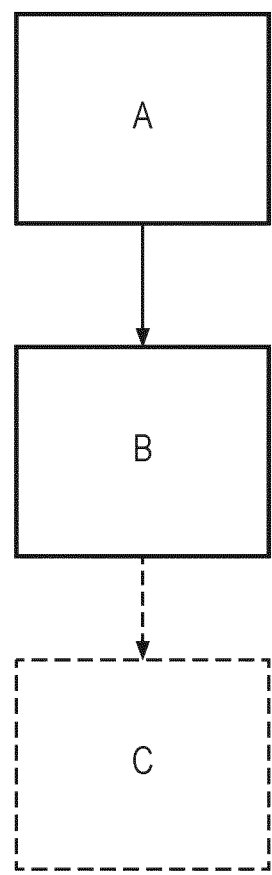
Figure 2:
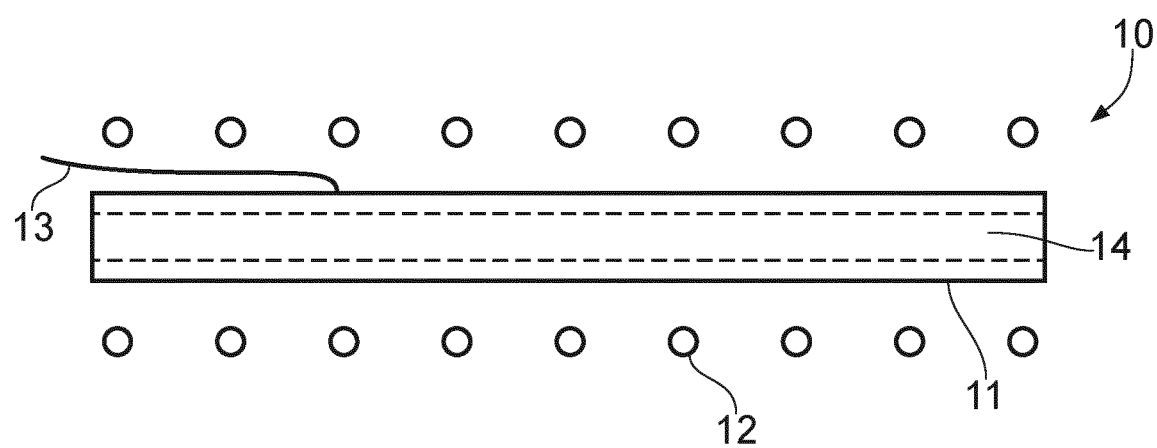

the varying electric current does not flow through the at least one inductor coil.

25 Claims, 9 Drawing Sheets

(51) Int. Cl.
| | |
|---|---|
| *A24F 40/51* | (2020.01) |
| *A24F 40/465* | (2020.01) |
| *A24F 40/20* | (2020.01) |
| *H05B 6/10* | (2006.01) |
| *G01K 1/02* | (2021.01) |
| *H05B 6/36* | (2006.01) |
| *G01K 7/02* | (2021.01) |
| *G01K 7/18* | (2006.01) |
| *H05B 6/12* | (2006.01) |

(52) U.S. Cl.
CPC ............... *G01K 7/02* (2013.01); *G01K 7/18* (2013.01); *H05B 6/105* (2013.01); *H05B 6/1254* (2013.01); *H05B 6/365* (2013.01)

(56) References Cited

U.S. PATENT DOCUMENTS

| | | |
|---|---|---|
| 2018/0325179 A1 | 11/2018 | Li et al. |
| 2019/0313695 A1 | 10/2019 | Kaufman et al. |
| 2020/0022412 A1* | 1/2020 | Abi Aoun ................ H05B 6/06 |
| 2020/0278707 A1* | 9/2020 | Sur ........................ A24F 40/50 |
| 2021/0112870 A1* | 4/2021 | Park ........................ H05B 6/36 |
| 2021/0145067 A1* | 5/2021 | Bleloch .................... H05B 6/06 |
| 2021/0145071 A1* | 5/2021 | Butin ...................... A24F 40/57 |

FOREIGN PATENT DOCUMENTS

| | | |
|---|---|---|
| RU | 2 670 060 C2 | 10/2018 |
| RU | 2 670 534 C1 | 10/2018 |
| WO | WO 95/27411 A1 | 10/1995 |
| WO | WO 2018/211035 A1 | 11/2001 |
| WO | WO 2015/131058 A1 | 9/2015 |
| WO | WO 2017/001819 A1 | 1/2017 |
| WO | WO 2017/198837 A1 | 11/2017 |
| WO | WO 2018/073376 A1 | 4/2018 |
| WO | WO 2018/195335 A1 | 10/2018 |

OTHER PUBLICATIONS

Korean Office Action dated May 17, 2021 in corresponding Korean Patent Application No. 10-2021-7001511 (with English translation), 13 pages.

Russian Office Action and Search Report dated Jul. 6, 2021 in corresponding Russian Patent Application No. 2021100546 (with English translation), 10 pages.

* cited by examiner

INDUCTIVE HEATING ARRANGEMENT COMPRISING A TEMPERATURE SENSOR

The invention relates to inductive heating arrangements for heating aerosol-forming substrates and to methods for measuring the temperature of a susceptor of the inductive heating arrangement.

Aerosol-generating articles in which an aerosol-forming substrate, such as a tobacco containing substrate, is heated rather than combusted are known in the art. An aim of such heated aerosol-generating articles is to reduce harmful or potentially harmful by-products produced by the combustion and pyrolytic degradation of tobacco in conventional cigarettes.

In aerosol-generating articles, an inhalable aerosol is typically generated by the transfer of heat from a heating element to an aerosol-forming substrate. During heating, volatile compounds are released from the aerosol-forming substrate and become entrained in air. For example, the volatile compounds may become entrained in air drawn through, over, around or otherwise within the vicinity of the aerosol-generating article. As the released volatile compounds cool, they condense to form an aerosol. The aerosol may be inhaled by a user. The aerosol may contain aromas, flavours, nicotine and other desired elements.

The heating element may be comprised in an aerosol-generating device. The combination of an aerosol-generating article and an aerosol-generating device may form an aerosol-generating system.

The heating element may be a resistive heating element which may be inserted into or disposed around the aerosol-forming substrate when the article is received in the aerosol-generating device. In other aerosol-generating systems, an inductive heating arrangement is used rather than a resistive heating element. The inductive heating arrangement typically comprises an inductor coil and a susceptor arranged such that it is in thermal proximity to the aerosol-forming substrate. The inductor coil generates a varying magnetic field to generate eddy currents and hysteresis losses in the susceptor, causing the susceptor to heat up, thereby heating the aerosol-forming substrate. Inductive heating allows aerosol to be generated without exposing the heating arrangement to the aerosol-generating article. This can improve the ease with which the heating arrangement may be cleaned. However, it can be difficult to accurately measure the temperature of the susceptor of such inductive heating arrangement and, in consequence, the amount of heat applied to the aerosol-forming substrate when an aerosol is being formed.

It would be desirable to provide an inductive heating arrangement which allows for an accurate measurement of the temperature of the susceptor. It would also be desirable to provide a method for an accurate measurement of the temperature of such susceptor.

A method for measuring the temperature of a susceptor of an inductive heating arrangement configured to heat an aerosol-forming substrate is provided. The inductive heating arrangement may comprise a cavity for receiving the aerosol-forming substrate heatable by the inductive heating arrangement. The inductive heating arrangement may comprise at least one inductor coil configured to generate a varying magnetic field when a varying electric current flows through the at least one inductor coil. The inductive heating arrangement may comprise at least one susceptor arranged relative to the at least one inductor coil in such a way that the at least one susceptor is heatable by penetration of the varying magnetic field, the at least one susceptor being configured to heat the aerosol-forming substrate. The inductive heating arrangement may comprise at least one temperature sensor. The method may comprise providing the at least one temperature sensor in thermal contact with the at least one susceptor. The method may comprise measuring the temperature of the at least one susceptor when the varying electric current does not flow through the at least one inductor coil.

In a disclosure, a method for measuring the temperature of a susceptor of an inductive heating arrangement configured to heat an aerosol-forming substrate is provided, the inductive heating arrangement comprising:

a cavity for receiving the aerosol-forming substrate heatable by the inductive heating arrangement;

at least one inductor coil configured to generate a varying magnetic field when a varying electric current flows through the at least one inductor coil;

at least one susceptor arranged relative to the at least one inductor coil in such a way that the at least one susceptor is heatable by penetration of the varying magnetic field, the at least one susceptor being configured to heat the aerosol-forming substrate;

at least one temperature sensor;

the method comprising:

providing the at least one temperature sensor in thermal contact with the at least one susceptor;

measuring the temperature of the at least one susceptor when the varying electric current does not flow through the at least one inductor coil.

The inductive heating arrangement may comprise at least one inductor coil. The at least one inductor coil is arranged to generate a varying magnetic field on receiving a varying current from a power supply. Such varying current may be between about 5 kilohertz and about 500 kilohertz. In some embodiments, the varying current is a high frequency varying current. As used herein, the term "high frequency varying current" means a varying current having a frequency of between about 500 kilohertz and about 30 megahertz. The high frequency varying current may have a frequency of between about 1 megahertz and about 30 megahertz, such as between about 1 megahertz and about 10 megahertz, or such as between about 5 megahertz and about 8 megahertz. The varying current may be an alternating current which generates an alternating magnetic field.

An inductor coil may have any suitable form. For example, an inductor coil may be a flat inductor coil. A flat inductor coil may be wound in a spiral, substantially in a plane. Preferably, the inductor coil is a tubular inductor coil. Typically, a tubular inductor coil is helically wound about a longitudinal axis. An inductor coil may be elongate. Particularly preferably, an inductor coil may be an elongate tubular inductor coil. An inductor coil may have any suitable transverse cross-section. For example, an inductor coil may have a circular, elliptical, square, rectangular, triangular or other polygonal transverse cross-section.

An inductor coil may be formed from any suitable material. An inductor coil is formed from an electrically conductive material. Preferably, the inductor coil is formed from a metal or a metal alloy.

As used herein, "electrically conductive" refers to materials having an electrical resistivity of less than or equal to $1 \times 10^{-4}$ ohm metres ($\Omega.m$), at twenty degrees Celsius.

The inductive heating arrangement may comprise at least one susceptor. As used herein, the term "susceptor" refers to an element comprising a material that is capable of converting magnetic energy into heat. When a susceptor is located in a varying magnetic field, such as the varying magnetic field generated by an inductor coil, the susceptor is heated. Heating of the susceptor may be the result of at least one of hysteresis losses and eddy currents induced in the susceptor, depending on the electrical and magnetic properties of the susceptor material.

A susceptor may comprise any suitable material. The susceptor may be formed from any material that can be inductively heated to a temperature sufficient to release volatile compounds from the aerosol-forming substrate. Preferred susceptors may be heated to a temperature in excess of about 250 degrees Celsius. Preferred susceptors may be formed from an electrically conductive material. Suitable materials for the elongate susceptor include graphite, molybdenum, silicon carbide, stainless steels, niobium, aluminium, nickel, nickel containing compounds, titanium, and composites of metallic materials. Preferred susceptors comprise a metal or carbon. Some preferred susceptors comprise a ferromagnetic material, for example, ferritic iron, a ferromagnetic alloy, such as ferromagnetic steel or stainless steel, ferromagnetic particles, and ferrite. Some preferred susceptors consists of a ferromagnetic material. A suitable susceptor may comprise aluminium. A suitable susceptor may consist of aluminium. A susceptor may comprise at least about 5 percent, at least about 20 percent, at least about 50 percent or at least about 90 percent of ferromagnetic or paramagnetic materials.

Preferably, a susceptor is formed from a material that is substantially impermeable to gases. In other words, preferably, a susceptor is formed from a material that is not gas permeable.

The at least one susceptor of the inductive heating arrangement may have any suitable form. For example, a susceptor may be elongate. A susceptor may have any suitable transverse cross-section. For example, a susceptor may have a circular, elliptical, square, rectangular, triangular or other polygonal transverse cross-section. A susceptor may be tubular.

In some preferred embodiments, a susceptor may comprise a susceptor layer provided on a support body. Arranging a susceptor in a varying magnetic field induces eddy currents in close proximity to the susceptor surface, in an effect that is referred to as the skin effect. Accordingly, it is possible to form a susceptor from a relatively thin layer of susceptor material, while ensuring the susceptor is effectively heated in the presence of a varying magnetic field. Making a susceptor from a support body and a relatively thin susceptor layer may facilitate manufacture of an aerosol-generating article that is simple, inexpensive and robust.

The support body may be formed from a material that is not susceptible to inductive heating. Advantageously, this may reduce heating of surfaces of the susceptor that are not in contact with an aerosol-forming substrate, where surfaces of the support body form surfaces of the susceptor that are not in contact with an aerosol-forming substrate.

The support body may comprise an electrically insulative material. As used herein, "electrically insulating" refers to materials having an electrical resistivity of at least $1 \times 10^4$ ohm metres ($\Omega m$), at twenty degrees Celsius.

Forming the support body from a thermally insulative material may provide a thermally insulative barrier between the susceptor layer and other components of an inductive heating arrangement, such as an inductor coil circumscribing the inductive heating element. Advantageously, this may reduce heat transfer between the susceptor and other components of an inductive heating system.

The thermally insulative material may also have a bulk thermal diffusivity of less than or equal to about 0.01 square centimetres per second ($cm^2/s$) as measured using the laser flash method. Providing a support body having such a thermal diffusivity may result in a support body with a high thermal inertia, which may reduce heat transfer between the susceptor layer and the support body, and reduce variations in the temperature of the support body.

The susceptor may be provided with a protective outer layer, for example a protective ceramic layer or protective glass layer. A protective outer layer may improve the durability of the susceptor and facilitate cleaning of the susceptor. The protective outer layer may substantially surround the susceptor. The susceptor may comprise a protective coating formed from a glass, a ceramic, or an inert metal.

A susceptor may have any suitable dimensions. A susceptor may have a length of between about 5 millimetres and about 15 millimetres, for example between about 6 millimetres and about 12 millimetres, or between about 8 millimetres and about 10 millimetres. A susceptor may have a width of between about 1 millimetre and about 8 millimetres, for example between about 3 millimetres and about 5 millimetres. A susceptor may have a thickness of between about 0.01 millimetres and about 2 millimetres. Where a susceptor has a constant cross-section, for example a circular cross-section, the susceptor may have a preferable width or diameter of between about 1 millimetre and about 5 millimetres.

The inductive heating arrangement may comprise at least one external heating element. The at least one external heating element may comprise the at least one susceptor. As used herein, the term "external heating element" refers to a heating element configured to heat an outer surface of an aerosol-forming substrate. The at least one external heating element may at least partially circumscribe the cavity for receiving the aerosol-forming substrate.

The inductive heating arrangement may comprise at least one internal heating element. The internal heating element may comprise the at least one susceptor. As used herein, the term "internal heating element" refers to a heating element configured to be inserted into an aerosol-forming substrate. The internal heating element may be in the form of a blade, a pin, and a cone. The at least one internal heating element may extend into the cavity for receiving the aerosol-forming substrate.

In some embodiments, the inductive heating arrangement comprises at least one internal heating element, and at least one external heating element.

The inductive heating arrangement is configured to heat an aerosol-forming substrate. As used herein, the term "aerosol-forming substrate" relates to a substrate capable of releasing volatile compounds that can form an aerosol. Such volatile compounds may be released by heating the aerosol-forming substrate. An aerosol-forming substrate is typically part of an aerosol-generating article.

The aerosol-forming substrate may comprise nicotine. The nicotine-containing aerosol-forming substrate may be a nicotine salt matrix.

The aerosol-forming substrate may be a liquid. The aerosol-forming substrate may comprise solid components and liquid components. Preferably, the aerosol-forming substrate is a solid.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. The aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term "crimped sheet" denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers may include polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, such as between about 5 percent and about 30 percent by weight on a dry weight basis. The aerosol-forming substrate may comprise other additives and ingredients, such as flavourants.

The inductive heating arrangement may comprise at least one temperature sensor.

The method may comprise the step of providing the at least one temperature sensor in thermal contact with the at least one susceptor. As a result, the at least one temperature sensor may measure the temperature of the at least one susceptor.

The method may comprise the step of measuring the temperature of the at least one susceptor when the varying electric current does not flow through the at least one inductor coil. It has been found out that the magnetic field which may be generated by the at least one inductor coil when the varying electric current flows through the at least one inductor coil may induce a current in the at least one temperature sensor. Such induced current may lead to an erroneous measurement of the temperature of the at least one susceptor. Therefore, measuring the temperature of the at least one susceptor when the varying electric current does not flow through the at least one inductor coil may improve the accuracy of the measurement of the temperature of the at least one susceptor. The method may further comprise the step of avoiding measuring the temperature of the at least one susceptor when the varying electric current flows through the at least one inductor coil. This further step may contribute to ensuring that the accuracy of the measurement of the temperature of the at least one susceptor is enhanced.

The at least one temperature sensor may be a thermocouple. The thermocouple may comprise a first thermocouple wire and a second thermocouple wire. The first thermocouple wire extends from a first proximal end to a first distal end. The second thermocouple wire extends from a second proximal end to a second distal end. The first proximal end is joined to the second proximal end, thus forming a joint. The joint is in thermal contact with the at least one susceptor. As used herein, "proximal end of a thermocouple wire" is defined as the end of a thermocouple wire the closest to the at least one susceptor.

Thermocouples sensors may provide an inexpensive arrangement to measure the temperature of the susceptor. Thermocouple sensors may be beneficial to measure a wide range of temperatures of operation of the susceptor. Thermocouple sensors may be advantageous in that they might not require an external power supply to be activated. The use of a thermocouple in the method of the present disclosure may improve the accuracy in the measurement of the temperature of the susceptor.

In an embodiment, the joint is in thermal contact with the at least one susceptor by means of a welding point.

The first thermocouple wire and the second thermocouple wire may have a diameter between about 5 micrometres and about 100 micrometres. As a result of these diameters, the first thermocouple wire and the second thermocouple wire may have a low thermal mass. This may be advantageous to allow for quick temperature stabilisation of the first thermocouple wire and the second thermocouple wire. Such quick temperature stabilisation may be useful to improve the accuracy of the measurement of the temperature of the susceptor at a given time.

The first thermocouple wire may be surrounded by a first electrical insulation layer. The second thermocouple wire may be surrounded by a second electrical insulation layer. The first and second electrical insulation layers are made of electrically insulative materials. The first and second electrical insulation layers may have a thickness between about 2 micrometres and about 10 micrometres. The provision of the first electrical insulation layer and the second electrical insulation layer may help reduce the generation of induced currents in the first thermocouple wire and the second thermocouple wire. By providing a first and second electrical insulation layers having a thickness between about 2 micrometres and about 10 micrometres, the first thermocouple wire and the second thermocouple wire may have a low thermal mass. This may lead to an adequate temperature stabilisation of the first thermocouple wire and the second thermocouple wire.

The first electrical insulation layer and the second electrical insulation layer may comprise parylene. This material may also contribute to improving the thermal stabilisation of the first thermocouple wire and the second thermocouple wire.

The at least one susceptor may comprise a thermal insulator arranged for thermally insulating the at least one susceptor from the first thermocouple wire and the second thermocouple wire. The thermal insulator is made from a thermally insulating material. This arrangement may be helpful to ensure that the thermocouple sensor is in thermal contact with the at least one susceptor only through the joint. This may also enhance the accuracy of the measurement of the temperature of the susceptor.

As used herein the term 'thermally insulative material' is used to describe material having a bulk thermal conductivity of less than or equal to about 100 milliwatts per metre Kelvin (mW/(mK)) at 23 degrees Celsius and a relative humidity of 50 percent as measured using the modified transient plane source (MTPS) method.

The first thermocouple wire may comprise chromel. The second thermocouple wire may comprise alumel.

The at least one temperature sensor may be a resistive temperature device. The resistive temperature device comprises a resistive element. The resistance of the resistive element increases when the temperature of the resistive element increases. Therefore, a correlation may be established between the resistance of the resistive element and the temperature of the resistive element. This way, the temperature of the resistive element may be obtained by measuring the resistance of the resistive element. Since the resistive element is in thermal contact with the at least one susceptor, the temperature of the resistive element may be used to obtain the temperature of the at least one susceptor. The resistive element is preferably formed from metal.

In an embodiment, the correlation is established in such a way that a resistance of the resistive element of 100 ohms indicates a temperature of the resistive element of 0 degrees Celsius.

The resistive element of the resistive temperature device may comprise platinum. Platinum may be a suitable material for the resistive element since it may be chemically inert. Platinum may provide a substantially linear relationship between the resistance of the resistive element and the temperature of the resistive element, thus facilitating calibration. Platinum has a high temperature coefficient of resistance. This may be helpful to allow for readily measurable resistance changes with temperature. This may also provide stability in the measurements since temperature does not drastically changes with time. The resistive element may comprise nickel.

In an embodiment, the inductive heating arrangement used in the method for measuring the temperature of the susceptor is such that:
- the at least one inductor coil comprises a first inductor coil and a second inductor coil, the first inductor coil being configured to generate a first varying magnetic field when a first varying electric current flows through the first inductor coil and the second inductor coil being configured to generate a second varying magnetic field when a second varying electric current flows through the second inductor coil;
- the at least one susceptor comprises a first susceptor and a second susceptor, the first susceptor arranged relative to the first inductor coil in such a way that the first susceptor is heatable by penetration of the first varying magnetic field, the second susceptor arranged relative to the second inductor coil in such a way that the second susceptor is heatable by penetration of the second varying magnetic field, the first susceptor and the second susceptor being configured to heat the aerosol-forming substrate;
- the method for measuring the temperature of the inductive heating arrangement further comprising:
  - providing the at least one temperature sensor in thermal contact with the first susceptor;
  - measuring the temperature of the first susceptor when the first varying electric current does not flow through the first inductor coil.

Providing an inductive heating arrangement with a first inductor coil arranged to heat a first susceptor and a second inductor coil arranged to heat a second susceptor enables selective heating of the first susceptor and the second susceptor. Such selective heating allows the inductive heating arrangement to heat different portions of an aerosol-forming substrate at different times, and may enable one of the susceptors to be heated to a different temperature than the other susceptor.

The provision of at the at least one temperature sensor in thermal contact with the first susceptor enables the measurement of the temperature of the first susceptor. By measuring the temperature of the first susceptor when the first varying electric current does not flow through the first inductor coil, it may be avoided that a current is induced in the at least one temperature sensor. Since such induced current may lead to erroneous measurements of temperature, the precision of the measurement of the temperature of the first susceptor may be improved when the induced current is reduced or suppressed.

The method of this embodiment may further comprise avoiding measuring the temperature of the first susceptor when the first varying electric current flows through the first inductor coil. This may further ensure that erroneous measurements are minimised or avoided, since measurements are not carried out at the times when the magnetic field generated by the first inductor coil may induce a current in the at least one temperature sensor.

The at least one temperature sensor of this embodiment may comprise a first temperature sensor and a second temperature sensor, the method comprising:
- providing the first temperature sensor in thermal contact with the first susceptor;
- measuring the temperature of the first susceptor when the first varying electric current does not flow through the first inductor coil;
- providing the second temperature sensor in thermal contact with the second susceptor;
- measuring the temperature of the second susceptor when the second varying electric current does not flow through the second inductor coil.

By arranging a temperature sensor in thermal contact with both the first susceptor and the second susceptor, the temperature of both susceptors may be advantageously measured with improved accuracy. This may be particularly advantageous when one of the susceptors is configured to be heated a different temperature than the other susceptor.

The method may further comprise:
- avoiding measuring the temperature of the first susceptor when the first varying electric current flows through the first inductor coil;
- avoiding measuring the temperature of the second susceptor when the second varying electric current flows through the second inductor coil.

This may further improve the accuracy of the measurements of the temperature of the first susceptor and the second susceptor.

An inductive heating arrangement is provided. The inductive heating arrangement may comprise a cavity for receiving an aerosol-forming substrate heatable by the inductive heating arrangement. The inductive heating arrangement may comprise at least one inductor coil configured to generate a varying magnetic field when a varying electric current flows through the at least one inductor coil. The inductive heating arrangement may comprise at least one susceptor arranged relative to the at least one inductor coil in such a way that the at least one susceptor is heatable by penetration of the varying magnetic field. The at least one susceptor may be configured to heat the aerosol-forming substrate. The at least one susceptor may comprise a thermocouple. The thermocouple may comprise a first thermocouple wire and a second thermocouple wire. The first thermocouple wire may extend from a first proximal end to a first distal end and the second thermocouple wire may extend from second proximal end to a second distal end, the first proximal end being joined to the second proximal end, thus forming a joint. The joint may be in thermal contact with the at least one susceptor. The first thermocouple wire and the second thermocouple wire may have a diameter between about 5 micrometres and about 100 micrometres. The first thermocouple wire and the second thermocouple wire may have a diameter between about 45 micrometres and about 55 micrometres.

In a disclosure, the inductive heating arrangement comprises:
- a cavity for receiving an aerosol-forming substrate heatable by the inductive heating arrangement;
- at least one inductor coil configured to generate a varying magnetic field when a varying electric current flows through the at least one inductor coil;
- at least one susceptor arranged relative to the at least one inductor coil in such a way that the at least one susceptor is heatable by penetration of the varying magnetic field, the at least one susceptor being configured to heat the aerosol-forming substrate;
- a thermocouple comprising a first thermocouple wire and a second thermocouple wire, the first thermocouple wire extending from a first proximal end to a first distal end, the second thermocouple wire extending from a second proximal end to a second distal end, the first proximal end being joined to the second proximal end, thus forming a joint, the joint being in thermal contact with the at least one susceptor;
- wherein the first thermocouple wire and the second thermocouple wire have a diameter between about 5 micrometres and about 100 micrometres, preferably between about 45 micrometres and about 55 micrometres.

The first thermocouple wire and the second thermocouple wire having such a diameter between about 5 micrometres and about 100 micrometres may have a low thermal mass. This may be advantageous to allow for quick temperature stabilisation of the first thermocouple wire and the second thermocouple wire. Such quick temperature stabilisation may be useful to ensure that the measurement of the temperature of the at least one susceptor at a given time is less influenced by the temperature or mode of operation of the inductive heating arrangement prior to such given time. From this it follows that the inductive heating arrangement comprising such first and second thermocouple wires may be advantageous to provide an improved measurement of the temperature of the at least one susceptor. This advantage may be even more relevant when the temperature of the at least one susceptor is measured with one of the methods disclosed above.

In a preferred embodiment, the first thermocouple wire and the second thermocouple wire have a diameter between about 45 micrometres and about 55 micrometres. This may allow for an even enhanced accuracy of measurement of the temperature of the at least one susceptor.

The first thermocouple wire may be surrounded by a first electrical insulation layer and the second thermocouple wire may be surrounded by a second electrical insulation layer, the first and second electrical insulation layers having a thickness between about 2 micrometres and about 10 micrometres. By providing a first and second electrical insulation layers having such thickness, the first thermocouple wire and the second thermocouple wire may have a low thermal mass. This may lead to an adequate temperature stabilisation of the first thermocouple wire and the second thermocouple wire. As a result, the inductive heating arrangement may provide a more accurate measurement of the temperature of the at least one susceptor even immediately after a change of temperature or mode of operation of the inductive heating arrangement.

An aerosol-generating device comprising any of the inductive heating arrangements disclosed above is provided. The aerosol-generating device may comprise a device housing. The device housing may at least partially define the cavity for receiving the aerosol-forming substrate. Preferably the cavity for receiving an aerosol-forming substrate is at a proximal end of the device.

As used herein, the term "aerosol-generating device" refers to a device that interacts with an aerosol-forming substrate to generate an aerosol.

Where the susceptor is a tubular susceptor, the tubular susceptor may at least partially define the cavity for receiving the aerosol-forming substrate. When the susceptor comprises a support body, the support body may be a tubular support body and the susceptor layer may be provided on an internal surface of the tubular support body. Providing the susceptor layer on the internal surface of the support body may position the susceptor layer adjacent an aerosol-forming substrate in the cavity for receiving the aerosol-forming substrate, improving heat transfer between the susceptor layer and the aerosol-forming substrate.

The device housing may be elongate. Preferably, the device housing is cylindrical in shape. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the aerosol-generating device is portable. The aerosol-generating device may have a size comparable to a conventional cigar or cigarette. The aerosol-generating device may have a total length between about 30 millimetres and about 150 millimetres. The aerosol-generating device may have an external diameter between about 5 millimetres and about 30 millimetres. The aerosol-generating device may be a handheld device. In other words, the aerosol-generating device may be sized and shaped to be held in the hand of a user.

The aerosol-generating device may comprise a power supply configured to provide a varying current to the inductor coil.

The power supply may be a DC power supply. In preferred embodiments, the power supply is a battery. The power supply may be a nickel-metal hydride battery, a nickel cadmium battery, or a lithium based battery, for example a lithium-cobalt, a lithium-iron-phosphate or a lithium-polymer battery. However, in some embodiments the power supply may be another form of charge storage device, such as a capacitor. The power supply may require recharging and may have a capacity that allows for the storage of enough energy for one or more user operations. For example, the power supply may have sufficient capacity to allow for continuous heating of an aerosol-forming substrate for a period of around six minutes, corresponding to the typical time taken to smoke a conventional cigarette, or for a period that is a multiple of six minutes. In another example, the power supply may have sufficient capacity to allow for a predetermined number of puffs or discrete activations of the aerosol generator. In another example, the power supply may have sufficient capacity to allow for a predetermined number of uses of the device or discrete activations. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The aerosol-generating device may comprise a controller connected to the at least one inductor coil and the power supply. The controller may be configured to control the supply of power to the at least one inductor coil from the power supply. The controller may comprise a microprocessor, which may be a programmable microprocessor, a microcontroller, or an application specific integrated chip (ASIC) or other electronic circuitry capable of providing control. The controller may comprise further electronic components. The controller may be configured to regulate a supply of current to the at least one inductor coil. Current may be supplied to the at least one inductor coil continuously following activation of the aerosol-generating device or may be supplied intermittently, such as on a puff by puff basis.

The controller may advantageously comprise DC/AC inverter, which may comprise a Class-D or Class-E power amplifier.

The controller may be configured to supply a varying current to the at least one inductor coil. The varying current may be between about 5 kilohertz and about 500 kilohertz. In some embodiments, the varying current is a high frequency varying current, that is, a current between about 500 kilohertz and about 30 megahertz. The high frequency varying current may have a frequency of between about 1 megahertz and about 30 megahertz, such as between about 1 megahertz and about 10 megahertz, or such as between about 5 megahertz and about 8 megahertz.

In some embodiments, the device housing comprises a mouthpiece. The mouthpiece may comprise at least one air inlet and at least one air outlet. The mouthpiece may comprise more than one air inlet. The one or more of the air inlets may reduce the temperature of the aerosol before it is delivered to a user and may reduce the concentration of the aerosol before it is delivered to a user.

In some embodiments, a mouthpiece is provided as part of an aerosol-generating article. As used herein, the term "mouthpiece" refers to a portion of an aerosol-generating system that is placed into a user's mouth in order to directly inhale an aerosol generated by the aerosol-generating system from an aerosol-generating article received by the aerosol-generating device.

The aerosol-generating device may include a user interface to activate the device, for example a button to initiate heating of an aerosol-generating article.

The aerosol-generating device may comprise a display to indicate a state of the device or of the aerosol-forming substrate.

An aerosol-generating system comprising any of the above aerosol-generating devices is provided. The aerosol-generating system further comprises an aerosol-generating article comprising the aerosol-forming substrate.

As used herein, the term "aerosol-generating article" refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco may be referred to herein as a tobacco stick.

As used herein, the term "aerosol-generating system" refers to the combination of an aerosol-generating device with an aerosol-generating article. In the aerosol-generating system, the aerosol-generating article and the aerosol-generating device cooperate to generate a respirable aerosol.

The aerosol-generating article may have any suitable form. The aerosol-generating article may be substantially cylindrical in shape. The aerosol-generating article may be substantially elongate. The aerosol-generating article may have a length and a circumference substantially perpendicular to the length.

The aerosol-forming substrate may be provided as an aerosol-generating segment containing an aerosol-forming substrate. The aerosol-generating segment may comprise a plurality of aerosol-forming substrates. The aerosol-generating segment may comprise a first aerosol-forming substrate and a second aerosol-forming substrate. In some embodiments, the second aerosol-forming substrate is substantially identical to the first aerosol-forming substrate. In some embodiments, the second aerosol-forming substrate is different from the first aerosol-forming substrate.

Where the aerosol-generating segment comprises a plurality of aerosol-forming substrates, the number of aerosol-forming substrates may be the same as the number of susceptors in the inductive heating element. Similarly, the number of aerosol-forming substrates may be the same as the number of inductor coils in the inductive heating arrangement.

The aerosol-generating segment may be substantially cylindrical in shape. The aerosol-generating segment may be substantially elongate. The aerosol-generating segment may also have a length and a circumference substantially perpendicular to the length.

Where the aerosol-generating segment comprises a plurality of aerosol-forming substrates, the aerosol-forming substrates may be arranged end-to-end along an axis of the aerosol-generating segment. In some embodiments, the aerosol-generating segment may comprise a separation between adjacent aerosol-forming substrates.

In some preferred embodiments, the aerosol-generating article may have a total length between about 30 millimetres and about 100 millimetres. In some embodiments, the aerosol-generating article has a total length of about 45 millimetres. The aerosol-generating article may have an outer diameter between about 5 millimetres and about 12 millimetres. In some embodiments, the aerosol-generating article may have an outer diameter of about 7.2 millimetres.

The aerosol-generating segment may have a length of between about 7 millimetres and about 15 millimetres. In some embodiments, the aerosol-generating segment may have a length of about 10 millimetres, or 12 millimetres.

The aerosol-generating segment preferably has an outer diameter that is about equal to the outer diameter of the aerosol-generating article. The outer diameter of the aerosol-generating segment may be between about 5 millimetres and about 12 millimetres. In one embodiment, the aerosol-generating segment may have an outer diameter of about 7.2 millimetres.

The aerosol-generating article may comprise a filter plug. The filter plug may be located at a proximal end of the aerosol-generating article. The filter plug may be a cellulose acetate filter plug. In some embodiments, the filter plug may have a length of about 5 millimetres to about 10 millimetres. In some preferred embodiments, the filter plug may have a length of about 7 millimetres.

The aerosol-generating article may comprise an outer wrapper. The outer wrapper may be formed from paper. The outer wrapper may be gas permeable at the aerosol-generating segment. In particular, in embodiments comprising a plurality of aerosol-forming substrates, the outer wrapper may comprise perforations or other air inlets at the interface between adjacent aerosol-forming substrates. Where a separation is provided between adjacent aerosol-forming substrates, the outer wrapper may comprise perforations or other air inlets at the separation. This may enable an aerosol-forming substrate to be directly provided with air that has not been drawn through another aerosol-forming substrate. This may increase the amount of air received by each aerosol-forming substrate. This may improve the characteristics of the aerosol generated from the aerosol-forming substrate.

The aerosol-generating article may also comprise a separation between the aerosol-forming substrate and the filter plug. The separation may be about 18 millimetres, but may be in the range of about 5 millimetres to about 25 millimetres.

These and other features and advantages of the invention will become more evident in the light of the following detailed description of preferred embodiments, given only by way of illustrative and non-limiting example, in reference to the attached figures:

FIG. 1 shows a schematic flow diagram of a method for measuring the temperature of a susceptor of an inductive heating arrangement.

FIG. 2 illustrates an inductive heating arrangement comprising an inductor coil, a susceptor, a cavity for receiving an aerosol-forming substrate and a temperature sensor.

FIG. 3 depicts an inductive heating arrangement comprising a first and a second inductor coil, a first and a second susceptor, a first and a second portion of the cavity for receiving an aerosol-forming substrate and a first and a second temperature sensor.

FIG. 4 depicts an inductive heating arrangement comprising a first and a second inductor coil, a susceptor, a cavity for receiving an aerosol-forming substrate and a first and a second temperature sensor.

FIG. 5 shows a thermocouple in thermal contact with the susceptor.

FIG. 6 shows a resistive temperature device in thermal contact with the susceptor.

FIG. 7 is a representation of an aerosol-generating system comprising an aerosol-generating article and an aerosol-generating device, the aerosol-generating device comprising an inductive heating arrangement.

FIG. 8 shows the aerosol-generating system of FIG. 7 when the aerosol-forming substrate of the aerosol-generating article is received in the cavity of the inductive heating arrangement.

FIG. 9 shows an aerosol-generating article comprising a filter assembly which includes a cooling segment, a filter segment and a mouth end segment.

FIG. 1 schematically represents a method for measuring the temperature of a susceptor in an inductive heating arrangement 10. Detailed embodiments of such inductive heating arrangement 10 are described with respect to FIGS. 2 to 8. The method of FIG. 1 comprises a step A whereby a temperature sensor 13 of the inductive heating arrangement 10 is provided in thermal contact with a susceptor 11 of the inductive heating arrangement 10. The method of FIG. 1 further comprises a step B whereby the temperature of the susceptor 11 is measured when a varying electric current does not flow through an inductor coil 12 of the inductive heating arrangement 10. The inductor coil 12 is configured to generate a varying magnetic field when such varying current flows through the inductor coil 12. The susceptor 11 is arranged relative to the inductor coil 12 coil in such a way that the susceptor 11 is heatable by penetration of the varying magnetic field. The susceptor 11 is configured to heat an aerosol-forming substrate. In an example of the embodiment of FIG. 1, the method further comprises a step C, represented in dashed lines. Step C consists of avoiding measuring the temperature of the susceptor 11 when the varying electric current flows through the inductor coil 12.

FIG. 2 shows the inductive heating arrangement 10 comprising the susceptor 11 and the inductor coil 12. As has been explained for FIG. 1, the inductor coil 12 is configured to generate a varying magnetic field when a varying electric current flows through the inductor coil 12. The susceptor 11 is arranged relative to the inductor coil 12 in such a way that the susceptor 11 is heatable by penetration of the varying magnetic field that may be generated by the inductor coil 12. The susceptor 11 is configured to heat an aerosol-forming substrate. Put another way, when the susceptor 11 is heated by penetration of the varying magnetic field, the aerosol-forming substrate may be heated by the susceptor. The aerosol-forming substrate heatable by the susceptor may be received in a cavity 14 of the inductive heating arrangement 10. In the embodiment of FIG. 2, the susceptor 11 is a tubular susceptor 11, the tubular susceptor defining the cavity 14 for receiving the aerosol-forming substrate.

A temperature sensor 13 is provided in thermal contact with the susceptor 11. As a result, the temperature sensor 13 may be used to measure the temperature of the susceptor 11. The measurement of the temperature of the susceptor 11 may be carried out when the varying electric current does not flow through the inductor coil 12. In particular, it may be avoided measuring the temperature of the susceptor 11 when the varying electric current flows through the inductor coil 12. This method improves the accuracy of the measurement of the temperature of the susceptor 11, since currents that may be induced in the temperature sensor 13 by the magnetic field generated by the inductor coil 12 are minimised. Such induced currents may lead to erroneous measurements of the temperature of the susceptor 11.

FIG. 3 illustrates an inductive heating arrangement 10 comprising a first susceptor 11 and a second susceptor 15. The inductive heating arrangement 10 also comprises a first inductor coil 12 and a second inductor coil 16. The first inductor coil 12 is configured to generate a first varying magnetic field when a first varying electric current flows through the first inductor coil 12. The second inductor coil 16 is configured to generate a second varying magnetic field when a second varying electric current flows through the second inductor coil 16. The first susceptor 11 is arranged relative to the first inductor coil 12 in such a way that the first susceptor 11 is heatable by penetration of the first varying magnetic field. The second susceptor 15 is arranged relative to the second inductor coil 16 in such a way that the second susceptor 15 is heatable by penetration of the second varying magnetic field. Therefore, when the first susceptor 11 is heated by penetration of the first varying magnetic field, the aerosol-forming substrate may be heated by the first susceptor 11. Likewise, when the second susceptor 15 is heated by penetration of the second varying magnetic field, the aerosol-forming substrate may be heated by the second susceptor 15.

The temperature sensor of the embodiment of FIG. 3 comprises a first temperature sensor 13 and a second temperature sensor 17. The first temperature sensor 13 is provided in thermal contact with the first susceptor 11. As a result, the first temperature sensor 13 may be used to measure the temperature of the first susceptor 11. The measurement of the temperature of the first susceptor 11 may be carried out when the first varying electric current does not flow through the first inductor coil 12. In particular, it may be avoided measuring the temperature of the first susceptor 11 when the first varying electric current flows through the first inductor coil 12.

The second temperature sensor 17 is provided in thermal contact with the second susceptor 15. As a result, the second temperature sensor 17 may be used to measure the temperature of the second susceptor 15. The measurement of the temperature of the second susceptor 15 may be carried out when the second varying electric current does not flow through the second inductor coil 16. In particular, it may be avoided measuring the temperature of the second susceptor 15 when the second varying electric current flows through the second inductor coil 16.

This method improves the accuracy of the measurements of the temperatures of the first susceptor 11 and the second susceptor 15, since currents that may be induced in the first temperature sensor 13 and the second temperature sensor 17 by the first and second magnetic fields respectively generated by the first inductor coil 12 and the second inductor coil 16 are minimised. Such induced currents may lead to erroneous measurements of the temperatures of the first susceptor 11 and the second susceptor 15.

Figure 3:
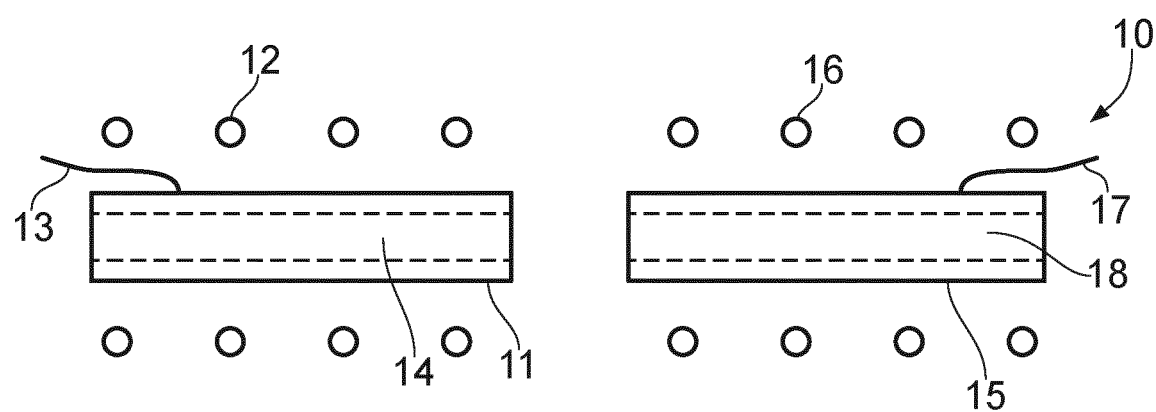

In the embodiment of FIG. 3, the first susceptor 11 is a tubular susceptor, the tubular susceptor defining a first portion 14 of the cavity for receiving the aerosol-forming substrate. Likewise, the second susceptor 15 is a tubular susceptor, the tubular susceptor defining a second portion 18 of the cavity for receiving the aerosol-forming substrate.

The embodiment of FIG. 3 enables selective heating of the first susceptor 11 and the second susceptor 15. Such selective heating enables the inductive heating arrangement 10 to heat different portions of an aerosol-forming substrate at different times, when the aerosol-forming substrate is received in the first portion 14 and the second portion 18 of the cavity, and may enable one of the susceptors 11, 15 to be heated to a different temperature than the other susceptor 15, 11. Such temperatures may be advantageously measured by using the method of FIG. 1.

Figure 4:
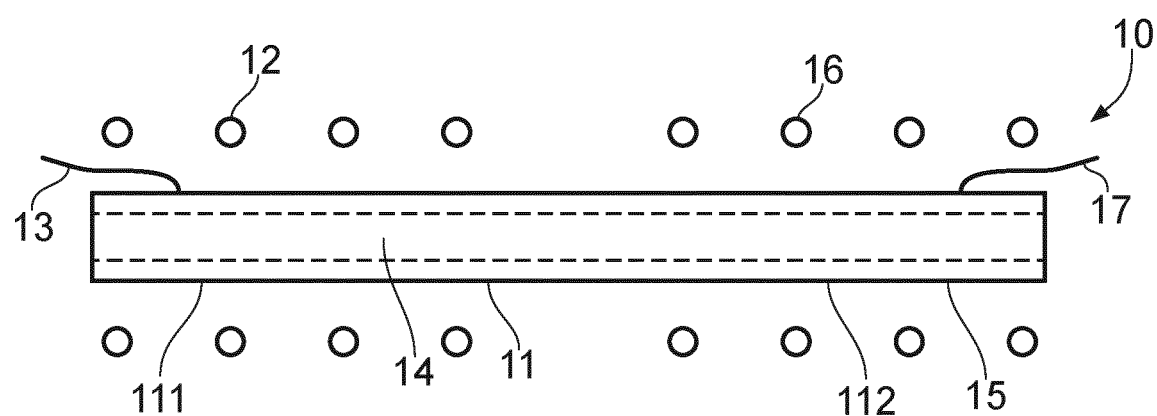

FIG. 4 illustrates an inductive heating arrangement 10 comprising a single susceptor 11 having a first region 111 and a second region 112. The inductive heating arrangement 10 also comprises a first inductor coil 12 and a second inductor coil 16. The first inductor coil 12 is configured to generate a first varying magnetic field when a first varying electric current flows through the first inductor coil 12. The second inductor coil 16 is configured to generate a second varying magnetic field when a second varying electric current flows through the second inductor coil 16. The first region 111 is arranged relative to the first inductor coil 12 in such a way that the first region 111 is heatable by penetration of the first varying magnetic field. The second region 112 is arranged relative to the second inductor coil 16 in such a way that the second region 112 is heatable by penetration of the second varying magnetic field. Therefore, when the first region 111 is heated by penetration of the first varying magnetic field, the aerosol-forming substrate may be heated by the first region 111. Likewise, when the second region 112 is heated by penetration of the second varying magnetic field, the aerosol-forming substrate may be heated by the second region 112.

The temperature sensor of the embodiment of FIG. 4 comprises a first temperature sensor 13 and a second temperature sensor 17. The first temperature sensor 13 is provided in thermal contact with the first region 111. As a result, the first temperature sensor 13 may be used to measure the temperature of the first region 111. The measurement of the temperature of the first region 111 may be carried out when the first varying electric current does not flow through the first inductor coil 12. In particular, it may be avoided measuring the temperature of the first region 111 when the first varying electric current flows through the first inductor coil 12.

The second temperature sensor 17 is provided in thermal contact with the second region 112. As a result, the second temperature sensor 17 may be used to measure the temperature of the second region 112. The measurement of the temperature of the second region 112 may be carried out when the second varying electric current does not flow through the second inductor coil 16. In particular, it may be avoided measuring the temperature of the second region 112 when the second varying electric current flows through the second inductor coil 16.

This method improves the accuracy of the measurements of the temperatures of the first region 111 and the second region 112 of the susceptor 11, since currents that may be induced in the first temperature sensor 13 and the second temperature sensor 17 by the first and second magnetic fields respectively generated by the first inductor coil 12 and the second inductor coil 16 are minimised. Such induced currents may lead to erroneous measurements of the temperatures of the first region 111 and the second region 112.

In the embodiment of FIG. 4, the susceptor 11 is a tubular susceptor, the tubular susceptor defining a cavity 14 for receiving the aerosol-forming substrate.

The embodiment of FIG. 4 enables selective heating of the first region 111 and the second region 112. Such selective heating enables the inductive heating arrangement 10 to heat different portions of an aerosol-forming substrate at different times, when the aerosol-forming substrate is received in the cavity 14, and may enable one of the regions 111, 112 to be heated to a different temperature than the other region 112, 111. Such temperatures may be advantageously measured by using the method of FIG. 1.

Figure 5:
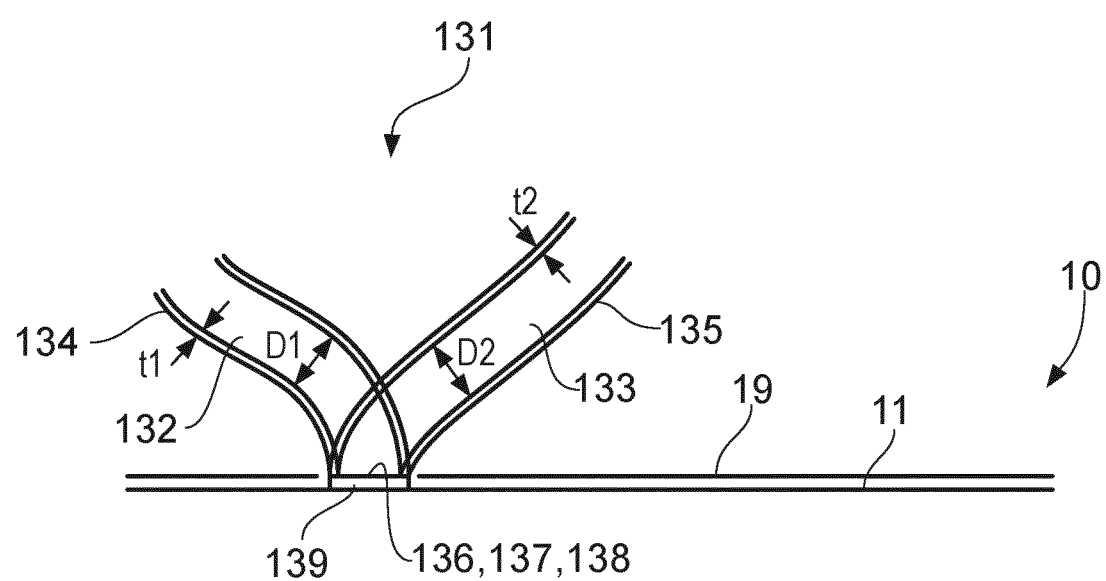

FIG. 5 represents in more detail the thermal contact between the temperature sensor 13 and the susceptor 11. In particular, the temperature sensor 13 of the embodiment of FIG. 5 is a thermocouple 131. The thermocouple 131 comprises a first thermocouple wire 132 and a second thermocouple wire 133. The first thermocouple wire 132 extends from a first proximal end 136 to a first distal end (not represented). The second thermocouple wire 133 extends from a second proximal end 137 to a second distal end (not represented). The first proximal end 136 is joined to the second proximal end 137 forming a joint 138 in thermal contact with susceptor 11. In the embodiment of FIG. 5, the joint 138 is in thermal contact with the susceptor 11 through a welding point 139.

In the embodiment of FIG. 5, the first thermocouple wire 132 has a first diameter D1 and the second thermocouple wire 133 has a second diameter D2. The first diameter D1 and the second diameter D2 are between about 5 micrometres and about 100 micrometres, preferably between about 45 micrometres and about 55 micrometres. Such diameters D1, D2 may contribute to a quick temperature stabilisation of the first thermocouple wire 132 and the second thermocouple wire 133.

In FIG. 5, the first thermocouple wire 132 is surrounded by a first electrical insulation layer 134 and the second thermocouple wire 133 is surrounded by a second electrical insulation layer 135. The first electrical insulation layer 134 has a first thickness t1 and the second electrical insulation layer 135 has a second thickness t2. Such thicknesses t1, t2 are between about 2 micrometres and about 10 micrometres, which may help achieve a quick temperature stabilisation in the first thermocouple wire 132 and the second thermocouple wire 133.

The first electrical insulation layer 134 and the second electrical insulation layer 135 of the embodiment of FIG. 5 comprise parylene. Likewise, the first thermocouple wire 132 comprises chromel and the second thermocouple wire 133 comprises alumel.

In FIG. 5, the susceptor 11 comprises a thermal insulator 19 arranged for thermally insulating the susceptor 11 from the first thermocouple wire 132 and the second thermocouple wire 133. This arrangement may help ensure that the thermocouple 131 is in thermal contact with the susceptor 11 only through the joint 138 and the welding point 139. This may also enhance the accuracy of the measurement of the temperature of the susceptor 11.

Figure 6:
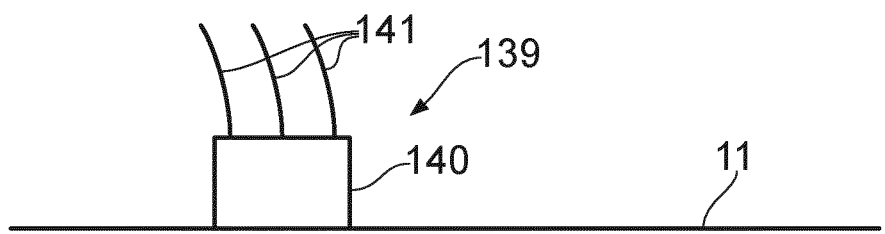

In FIG. 6, the temperature sensor 13 is a resistive temperature device 139. The resistive temperature device 139 comprises a resistive element 140 whose resistance increases when its temperature increases. Wiring 141 is provided to connect the resistive element 139 to a measuring device configured to measure a resistance of a circuit formed from the resistive element 140 and the wiring 141.

A correlation may be established between the resistance of the resistive element 140 and the temperature of the resistive element 140. This way, the temperature of the resistive element 140, which corresponds to the temperature of the susceptor 11 in thermal contact with the resistive element 140, may be obtained by measuring the resistance of the resistive element 140. The resistive element 140 is preferably formed from metal. More preferably, the resistive element 140 comprises at least one of platinum and nickel.

The wiring 141 may be designed in such a way that the resistance of the circuit formed from the resistive element 140 and the wiring 141 is substantially the same as the resistance of the resistive element 141. Put another way, the configuration of the wiring 141 may reduce the error in the measurement of the resistance of the resistive element 140.

In an example, the wiring 141 comprises two wires connecting opposite ends of the resistive element 141 to the measuring device. In this example, the resistance of the circuit formed from the resistive element 140 and the wiring 141 is equal to the resistance of the resistive element 141 plus the resistance of each one of the two wires. This may cause that the temperature measured by the resistive temperature device 139 is greater than the temperature of the resistive element 140, which corresponds to the temperature of the susceptor 11.

In another example, the wiring 141 comprises three wires. Two wires connect one end of the resistive element 141 to the measuring device. The remaining wire connects the opposite end of the resistive element 141 to the measurement device. The three wires of the wiring 141 may be identical in material and length. Such three wires may have a similar resistance. The resistance of the circuit formed from the resistive element 140 and the wiring 141 may be measured exclusively through the two wires on the same end of the resistive element 140. Such first measurement will indicate the total resistance of those two wires. Likewise, the resistance of the circuit formed from resistive element 140 and the wiring 141 may be measured through the wire on the opposite end of the resistive element 140 and one of the other two wires. Such second measurement will indicate the resistance of the resistive element 140 plus the total resistance of the two wires used for the measurement. When the resistance of the three wires is the same, a more accurate measurement of the resistance of the resistive element 140 may be obtained by subtracting the value of the first measurement from the value of the second measurement.

Other configurations of wiring 141 known in the art, such as a wiring 141 comprising four wires, can also be used in the present invention.

Figure 7:
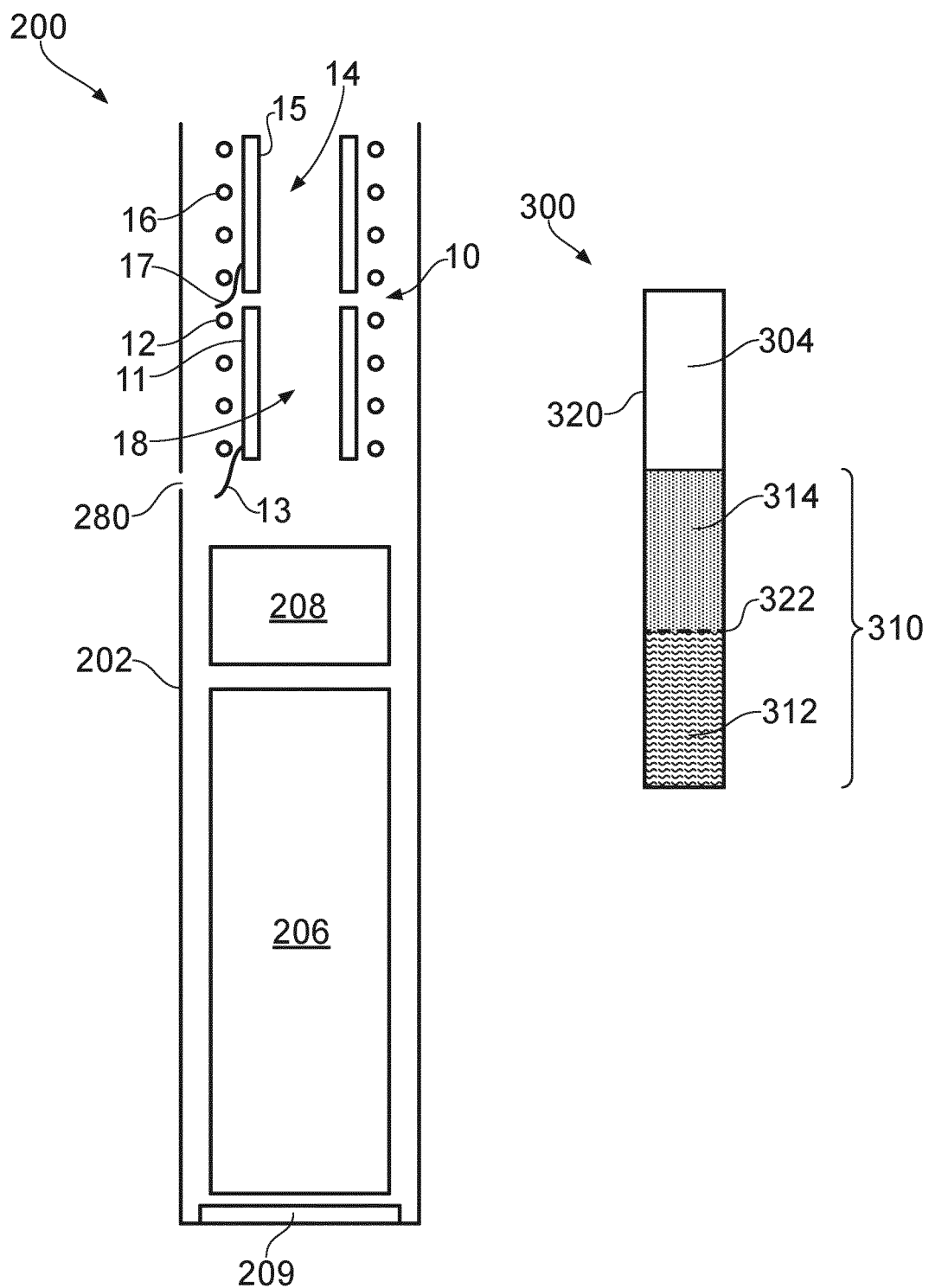
Figure 8:
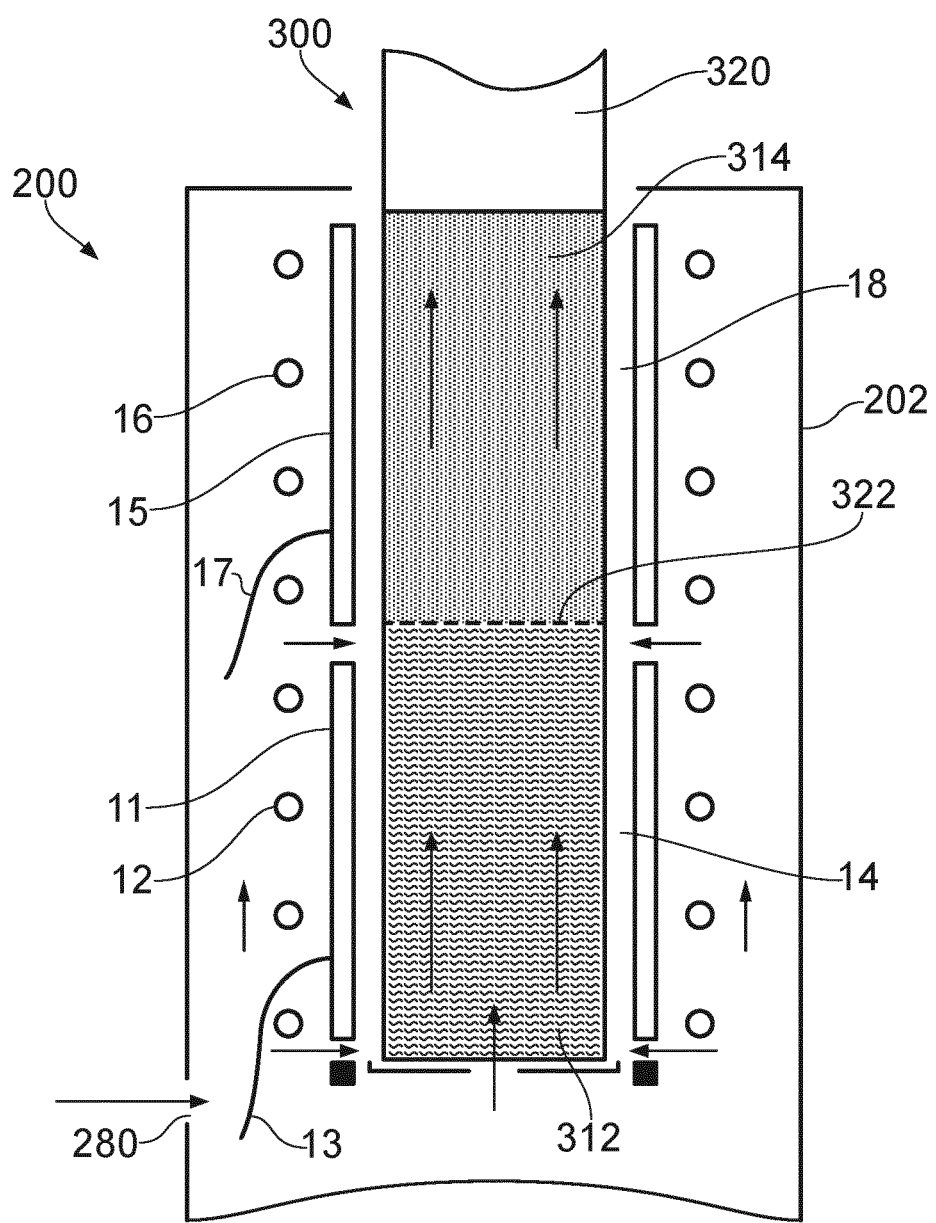

FIGS. 7 and 8 show schematic cross-sections of an aerosol-generating device 200 and the aerosol-generating article 300.

The aerosol-generating device 200 comprises a substantially cylindrical device housing 202, with a shape and size similar to a conventional cigar.

The aerosol-generating device 200 further comprises a power supply 206, in the form of a rechargeable nickel-cadmium battery, a controller 208 in the form of a printed circuit board including a microprocessor, an electrical connector 209, and the inductive heating arrangement 10. In the embodiment of FIGS. 7 and 8, the inductive heating arrangement 10 is similar to that of FIG. 3. However, other inductive heating arrangements may be used. In particular, inductive heating arrangements comprising one inductor coil and one susceptor may be used. Alternatively, inductive heating arrangements comprising more than two inductor coils and more than two susceptors may be used. In a preferred alternative, inductive heating arrangements comprising one susceptor, two inductor coils and two temperature sensors may be used; in particular, the inductive heating arrangement of FIG. 4 can be used.

The power supply 206, controller 208 and inductive heating arrangement 10 are all housed within the device housing 202. The inductive heating arrangement 10 of the aerosol-generating device 200 is arranged at the proximal end of the device 200. The electrical connector 209 is arranged at a distal end of the device housing 202.

As used herein, the term "proximal" refers to a user end, or mouth end of the aerosol-generating device or aerosol-generating article. The proximal end of a component of an aerosol-generating device or an aerosol-generating article is the end of the component closest to the user end, or mouth end of the aerosol-generating device or the aerosol-generating article. As used herein, the term "distal" refers to the end opposite the proximal end.

The controller 208 is configured to control the supply of power from the power supply 206 to the inductive heating arrangement 10. The controller 208 further comprises a DC/AC inverter, including a Class-D power amplifier. The controller 208 is also configured to control recharging of the power supply 206 from the electrical connector 209. The controller 208 further comprises a puff sensor (not shown) configured to sense when a user is drawing on an aerosol-generating article received in the cavity 14, 18.

The inductive heating arrangement 10 comprises a first inductor coil 12 and a second inductor coil 16. The inductive heating arrangement 10 also comprises a first susceptor 11 and a second susceptor 15. As described for FIG. 3, the first susceptor 11 is a tubular susceptor, the tubular susceptor defining a first portion 14 of the cavity for receiving the aerosol-forming substrate. Likewise, the second susceptor 15 is a tubular susceptor, the tubular susceptor defining a second portion 18 of the cavity for receiving the aerosol-forming substrate. The first 12 and second 16 inductor coils are also tubular in the embodiment of FIGS. 7 and 8, and they are disposed concentrically around, respectively, the first susceptor 11 and the second susceptor 15.

The first inductor coil 12 is connected to the controller 208 and the power supply 206, and the controller 208 is configured to supply a first varying electric current to the first inductor coil 12. When the first varying electric current is supplied to the first inductor coil 12, the first inductor coil 12 generates a first varying magnetic field, which heats the first susceptor 11 by induction.

The second inductor coil 16 is connected to the controller 208 and the power supply 208, and the controller 208 is configured to supply a second varying electric current to the second inductor coil 16. When the second varying electric current is supplied to the second inductor coil 16, the second inductor coil 16 generates a second varying magnetic field, which heats the second susceptor 15 by induction.

The inductive heating arrangement 10 comprises a first temperature sensor 13 in thermal contact with the first susceptor 11. The inductive heating arrangement 10 comprises a second temperature sensor 17 in thermal contact with the second susceptor 15. The first 13 and second 17 temperature sensors may be used to respectively measure the temperatures of the first susceptor 11 and the second susceptor 15 as described for FIG. 3.

The device housing 202 also defines an air inlet 280 in close proximity to the distal end of the cavity 14, 18 for receiving the aerosol-forming substrate. The air inlet 280 is configured to enable ambient air to be drawn into the device housing 202. Airflow pathways are defined through the device to enable air to be drawn from the air inlet 280 into the cavity 14, 18.

The aerosol-generating article 300 is generally in the form of a cylindrical rod, having a diameter similar to the inner diameter of the cavity 14, 18 for receiving the aerosol-forming substrate. The aerosol-generating article 300 comprises a cylindrical cellulose acetate filter plug 304 and a cylindrical aerosol-generating segment 310 wrapped together by an outer wrapper 320 of cigarette paper.

The filter plug 304 is arranged at a proximal end of the aerosol-generating article 300, and forms the mouthpiece of the aerosol-generating system, on which a user draws to receive aerosol generated by the system.

The aerosol-generating segment 310 is arranged at a distal end of the aerosol-generating article 300, and has a length substantially equal to the length of the cavity 14, 18. The aerosol-generating segment 310 comprises a plurality of aerosol-forming substrates, including: a first aerosol-forming substrate 312 at a distal end of the aerosol-generating article 300 and a second aerosol-forming substrate 314 at a proximal end of the aerosol-generating segment 210, adjacent the first aerosol-forming substrate 312. It will be appreciated that in some embodiments two or more of the aerosol-forming substrates may be formed from the same materials. However, in this embodiment, each of the aerosol-forming substrates 312, 314 is different. The first aerosol-forming substrate 312 comprises a gathered and crimped sheet of homogenised tobacco material, without additional flavourings. The second aerosol-forming substrate 314 comprises a gathered and crimped sheet of homogenised tobacco material including a flavouring in the form of menthol. In other examples, an aerosol-forming substrate may comprise a flavouring in the form of menthol, and not comprise tobacco material or any other source of nicotine. Each of the aerosol-forming substrates 312, 314 may also comprise further components, such as one or more aerosol formers and water, such that heating the aerosol-forming substrate generates an aerosol with desirable organoleptic properties.

The proximal end of the first aerosol-forming substrate 312 is exposed, as it is not covered by an outer wrapper 320. The outer wrapper 320 comprises a line of perforations 322 circumscribing the aerosol-generating article 300 at the interface between the first aerosol-forming substrate 312 and the second aerosol-forming substrate 314. The perforations 322, enable air to be drawn into the aerosol-generating segment 310.

In this embodiment, the first aerosol-forming substrate 312 and the second aerosol-forming substrate 314 are arranged end-to-end. However, it is envisaged that in other embodiments, a separation may be provided between the first aerosol-forming substrate 312 and the second aerosol-forming substrate 314.

Figure 9:
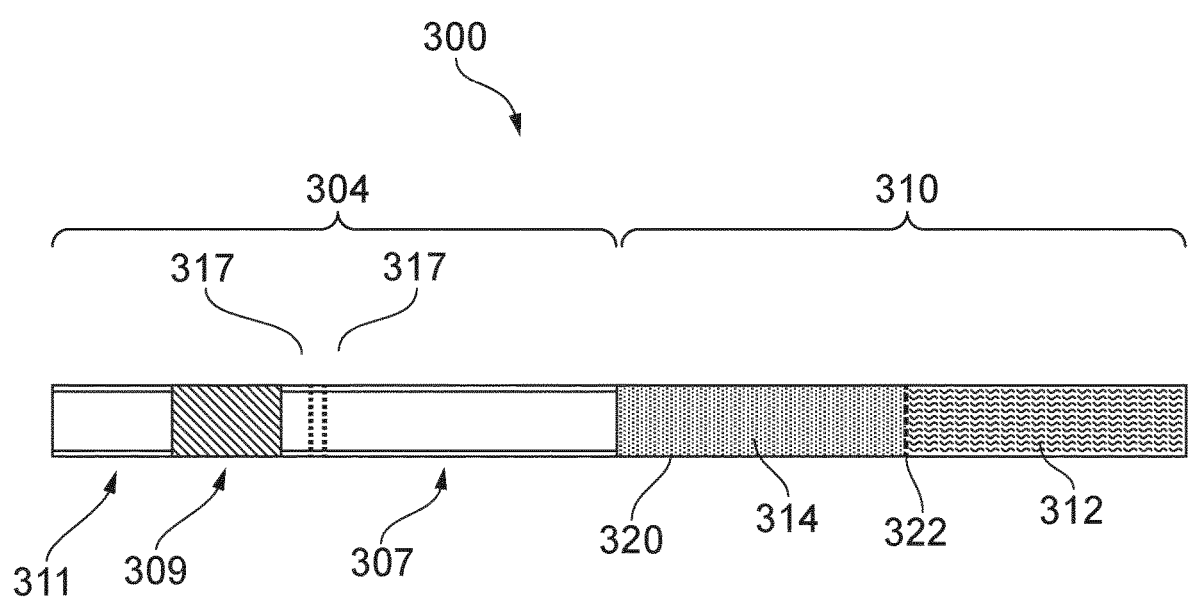

FIG. 9 shows an aerosol-generating article similar to those of FIGS. 7 and 8.

However, the filter plug 304 is a filter assembly 304 in the form of a rod. The filter assembly 304 includes three segments: a cooling segment 307, a filter segment 309 and a mouth end segment 311. In the embodiment of FIG. 9, the cooling segment 307 is located adjacent the second aerosol-forming substrate 314, between the second aerosol-forming substrate 314 and the filter segment 309, such that the cooling segment 307 is in an abutting relationship with the second aerosol-forming substrate 314 and the filter segment 309. In other examples, there may be a separation between the second aerosol-forming substrate 314 and the cooling segment 307 and between the cooling segment 307 and the filter segment 309. The filter segment 309 is located in between the cooling segment 307 and the mouth end segment 311. The mouth end segment 311 is located towards the proximal end of the article 300, adjacent the filter segment 309. In the embodiment of FIG. 9, the filter segment 309 is in an abutting relationship with the mouth end segment 311. In one example, the total length of the filter assembly 304 is between 37 millimetres and 45 millimetres, more preferably, the total length of the filter assembly 304 is 41 millimetres.

In one example of the embodiment of FIG. 9, the aerosol-generating segment 310 is between 34 millimetres and 50 millimetres in length, more preferably, the aerosol-generating segment 310 is between 38 millimetres and 46 millimetres in length, more preferably still, the aerosol-generating segment 310 is 42 millimetres in length.

In one example of the embodiment of FIG. 9, the total length of the article 300 is between 71 millimetres and 95 millimetres, more preferably, the total length of the article 300 is between 79 millimetres and 87 millimetres, more preferably still, the total length of the article 300 is 83 millimetres.

In one example, the cooling segment 307 is an annular tube and defines an air gap within the cooling segment 307. The air gap provides a chamber for heated volatilised components generated from the aerosol-generating segment 310 to flow. The cooling segment 307 is hollow to provide a chamber for aerosol accumulation yet rigid enough to withstand axial compressive forces and bending moments that might arise during manufacture and whilst the article 300 is in use during insertion into the aerosol-generating device 200. In one example, the thickness of the wall of the cooling segment 307 is approximately 0.29 millimetres.

The cooling segment 307 provides a physical displacement between the aerosol-generating segment 310 and the filter segment 309. The physical displacement provided by the cooling segment 307 will provide a thermal gradient across the length of the cooling segment 307. In one example the cooling segment 307 is configured to provide a temperature differential of at least 40 degrees Celsius between a heated volatilised component entering a distal end of the cooling segment 307 and a heated volatilised component exiting a proximal end of the cooling segment 307. In one example the cooling segment 307 is configured to provide a temperature differential of at least 60 degrees Celsius between a heated volatilised component entering a distal end of the cooling segment 307 and a heated volatilised component exiting a proximal end of the cooling segment 307. This temperature differential across the length of the cooling element 307 protects the temperature sensitive filter segment 309 from the high temperatures of the aerosol formed from the aerosol-generating segment 310.

In one example of the article 300 of FIG. 9, the length of the cooling segment 307 is at least 15 millimetres. In one example, the length of the cooling segment 307 is between 20 millimetres and 30 millimetres, more particularly 23 millimetres to 27 millimetres, more particularly 25 millimetres to 27 millimetres and more particularly 25 millimetres.

The cooling segment 307 is made of paper, which means that it is comprised of a material that does not generate compounds of concern. In one example of the article 300 of FIG. 9, the cooling segment 307 is manufactured from a spirally wound paper tube which provides a hollow internal chamber yet maintains mechanical rigidity. Spirally wound paper tubes are able to meet the tight dimensional accuracy requirements of high-speed manufacturing processes with respect to tube length, outer diameter, roundness and straightness. In another example, the cooling segment 307 is a recess created from stiff plug wrap or tipping paper. The stiff plug wrap or tipping paper is manufactured to have a rigidity that is sufficient to withstand the axial compressive forces and bending moments that might arise during manufacture and whilst the article 300 is in use during insertion into the aerosol-generating device 200.

For each of the examples of the cooling segment 307, the dimensional accuracy of the cooling segment is sufficient to meet the dimensional accuracy requirements of high-speed manufacturing process.

The filter segment 309 may be formed of any filter material sufficient to remove one or more volatilised compounds from heated volatilised components from the aerosol-generating segment 310. In one example of the article 300 of FIG. 9, the filter segment 309 is made of a monoacetate material, such as cellulose acetate. The filter segment 309 provides cooling and irritation-reduction from the heated volatilised components without depleting the quantity of the heated volatilised components to an unsatisfactory level for a user.

The density of the cellulose acetate tow material of the filter segment 309 controls the pressure drop across the filter segment 309, which in turn controls the draw resistance of the article 300. Therefore the selection of the material of the filter segment 309 is important in controlling the resistance to draw of the article 300. In addition, the filter segment performs a filtration function in the article 300.

The presence of the filter segment 309 provides an insulating effect by providing further cooling to the heated volatilised components that exit the cooling segment 307. This further cooling effect reduces the contact temperature of the user's lips on the surface of the filter segment 309.

One or more flavours may be added to the filter segment 309 in the form of either direct injection of flavoured liquids into the filter segment 309 or by embedding or arranging one or more flavoured breakable capsules or other flavour carriers within the cellulose acetate tow of the filter segment 309. In one example of the article 300 of FIG. 9, the filter segment 309 is between 6 millimetres to 10 millimetres in length, more preferably 8 millimetres.

The mouth end segment 311 is an annular tube and defines an air gap within the mouth end segment 311. The air gap provides a chamber for heated volatilised components that flow from the filter segment 309. The mouth end segment 311 is hollow to provide a chamber for aerosol accumulation yet rigid enough to withstand axial compressive forces and bending moments that might arise during manufacture and whilst the article is in use during insertion into the aerosol-generating device 200. In one example, the thickness of the wall of the mouth end segment 311 is approximately 0.29 millimetres.

In one example, the length of the mouth end segment 311 is between 6 millimetres to 10 millimetres and more preferably 8 millimetres.

The mouth end segment 311 may be manufactured from a spirally wound paper tube which provides a hollow internal chamber yet maintains critical mechanical rigidity. Spirally wound paper tubes are able to meet the tight dimensional accuracy requirements of high-speed manufacturing processes with respect to tube length, outer diameter, roundness and straightness.

The mouth end segment 311 provides the function of preventing any liquid condensate that accumulates at the exit of the filter segment 309 from coming into direct contact with a user.

It should be appreciated that, in one example, the mouth end segment 311 and the cooling segment 307 may be formed of a single tube and the filter segment 309 is located within that tube separating the mouth end segment 311 and the cooling segment 307.

In the article 300 of FIG. 9, ventilation holes 317 are located in the cooling segment 307 to aid with the cooling of the article 300. In one example, the ventilation holes 317 comprise one or more rows of holes, and preferably, each row of holes is arranged circumferentially around the article 300 in a cross-section that is substantially perpendicular to a longitudinal axis of the article 300.

In one example of the article 300 of FIG. 9, there are between one to four rows of ventilation holes 317 to provide ventilation for the article 300. Each row of ventilation holes 317 may have between 12 to 36 ventilation holes 317. The ventilation holes 317 may, for example, be between 100 to 500 micrometres in diameter. In one example, an axial separation between rows of ventilation holes 317 is between 0.25 millimetres and 0.75 millimetres, more preferably, an axial separation between rows of ventilation holes 317 is 0.5 millimetres.

In one example of the article 300 of FIG. 9, the ventilation holes 317 are of uniform size. In another example, the ventilation holes 317 vary in size. The ventilation holes can be made using any suitable technique, for example, one or more of the following techniques: laser technology, mechanical perforation of the cooling segment 307 or pre-perforation of the cooling segment 307 before it is formed into the article 300. The ventilation holes 317 are positioned so as to provide effective cooling to the article 300.

In one example of the article 300 of FIG. 9, the rows of ventilation holes 317 are located at least 11 millimetres from the proximal end of the article 300, more preferably the ventilation holes 317 are located between 17 millimetres and 20 millimetres from the proximal end of the article 300. The location of the ventilation holes 317 is positioned such that user does not block the ventilation holes 317 when the article 300 is in use.

Advantageously, providing the rows of ventilation holes between 17 millimetres and 20 mm from the proximal end of the article 300 enables the ventilation holes 317 to be located outside of the aerosol-generating device 200 when the article 300 is fully inserted in the aerosol-generating device 200. By locating the ventilation holes 317 outside of the device 200, non-heated air is able to enter the article 300 through the ventilation holes from outside the device 200 to aid with the cooling of the article 300.

The length of the cooling segment 307 is such that the cooling segment 307 will be partially inserted into the device 200 when the article 300 is fully inserted into the device 200.

As shown in FIG. 8, the length of the first aerosol-forming substrate 312 is such that the first aerosol-forming substrate 312 extends from the distal end of the cavity 14, 18 for receiving the aerosol-forming substrate along the first portion 14 of the cavity. The length of the second aerosol-forming substrate 314 is such that the second aerosol-forming substrate 314 extends along the second portion 18 of the cavity until the proximal end of the cavity 14, 18.

In use, when an aerosol-generating article 300 is received in the cavity 14, 18, a user may draw on the proximal end of the aerosol-generating article 300 to inhale aerosol generated by the aerosol-generating system. When a user draws on the proximal end of the aerosol-generating article 300, air is drawn into the device housing 202 at the air inlet 280, and is drawn into the aerosol-generating segment 310 of the aerosol-generating article 300. Air is drawn into the proximal end of the first aerosol-forming substrate 312 and into the proximal end of the second aerosol-forming substrate 314.

In this embodiment, the controller 208 of the aerosol-generating device 200 is configured to supply power to the inductor coils 12, 16 of the inductive heating arrangement 10 in a predetermined sequence. The predetermined sequence comprises supplying a first varying electric current to the first inductor coil 12 during a first draw from the user, subsequently supplying a second varying electric current to the second inductor coil 16 during a second draw from the user, after the first draw has finished. On the third draw, the sequence starts again at the first inductor coil 12. This sequence results in heating of the first aerosol-forming substrate 312 on a first puff and in heating of the second aerosol-forming substrate 314 on a second puff. Since the aerosol forming substrates 312, 314 of the article 300 are all different, this sequence results in a different experience for a user on each puff on the aerosol-generating system.

The measurement of the temperature of the first susceptor 11 may be carried out during the second draw from the user, that is, when the first varying electric current does not flow through the first inductor coil 12. Likewise, it may be avoided measuring the temperature of the first susceptor 11 during the first draw from the user, that is, when the first varying electric current flows through the first inductor coil 12.

The measurement of the temperature of the second susceptor 15 may be carried out during the first draw from the user, that is, when the second varying electric current does not flow through the second inductor coil 16. Likewise, it may be avoided measuring the temperature of the second susceptor 15 during the second draw from the user, that is, when the second varying electric current flows through the second inductor coil 16.

This method improves the accuracy of the measurements of the temperatures of the first susceptor 11 and the second susceptor 15.

In an example of this embodiment, the first temperature sensor 13 is a thermocouple 131 as illustrated in FIG. 5. In another example, the first temperature sensor 13 is a resistive temperature device 139, as shown in FIG. 6. In another example, the second temperature device 17 is a thermocouple 131. In another example, the second temperature sensor 17 is a resistive temperature device 139.

The invention claimed is:

1. A method for measuring a temperature of a susceptor of an inductive heating arrangement configured to heat an aerosol-forming substrate,
the inductive heating arrangement comprising:
a cavity configured to receive the aerosol-forming substrate heatable by the inductive heating arrangement,
at least one inductor coil configured to generate a varying magnetic field when a varying electric current flows through the at least one inductor coil,
at least one susceptor arranged relative to the at least one inductor coil such that the at least one susceptor is heatable by penetration of the varying magnetic field, the at least one susceptor being configured to heat the aerosol-forming substrate, and
at least one temperature sensor; and
the method comprising:
providing the at least one temperature sensor in thermal contact with the at least one susceptor, and
measuring the temperature of the at least one susceptor when the varying electric current does not flow through the at least one inductor coil.

2. The method of claim 1, further comprising:
avoiding measuring the temperature of the at least one susceptor when the varying electric current flows through the at least one inductor coil.

3. The method of claim 1, wherein the at least one temperature sensor is a resistive temperature device, the resistive temperature device comprising a resistive element such that a resistance of the resistive element increases when a temperature of the resistive element increases.

4. The method of claim 3, wherein the resistive element of the resistive temperature device comprises platinum.

5. The method of claim 1,
wherein the at least one inductor coil comprises a first inductor coil and a second inductor coil, the first inductor coil being configured to generate a first varying magnetic field when a first varying electric current flows through the first inductor coil and the second inductor coil being configured to generate a second varying magnetic field when a second varying electric current flows through the second inductor coil,
wherein the at least one susceptor comprises a first susceptor and a second susceptor, the first susceptor arranged relative to the first inductor coil such that the first susceptor is heatable by penetration of the first varying magnetic field, the second susceptor arranged relative to the second inductor coil such that the second susceptor is heatable by penetration of the second varying magnetic field, the first susceptor and the second susceptor being configured to heat the aerosol-forming substrate, and
the method further comprising:
providing the at least one temperature sensor in thermal contact with the first susceptor, and
measuring the temperature of the first susceptor when the first varying electric current does not flow through the first inductor coil.

6. The method of claim 5, further comprising:
avoiding measuring the temperature of the first susceptor when the first varying electric current flows through the first inductor coil.

7. The method of claim 5,
wherein the at least one temperature sensor comprises a first temperature sensor and a second temperature sensor, and the method further comprising:
providing the first temperature sensor in thermal contact with the first susceptor,
measuring the temperature of the first susceptor when the first varying electric current does not flow through the first inductor coil,
providing the second temperature sensor in thermal contact with the second susceptor, and
measuring the temperature of the second susceptor when the second varying electric current does not flow through the second inductor coil.

8. The method of claim 7, further comprising:
avoiding measuring the temperature of the first susceptor when the first varying electric current flows through the first inductor coil; and
avoiding measuring the temperature of the second susceptor when the second varying electric current flows through the second inductor coil.

9. The method of claim 1, wherein the at least one temperature sensor is a thermocouple.

10. The method of claim 9, wherein the at least one temperature sensor is a thermocouple comprising a first thermocouple wire and a second thermocouple wire, the first thermocouple wire extending from a first proximal end to a first distal end, the second thermocouple wire extending from a second proximal end to a second distal end, the first proximal end being joined to the second proximal end, thus forming a joint, the joint being in thermal contact with the at least one susceptor.

11. The method of claim 10, wherein the joint is in thermal contact with the at least one susceptor by means of a welding point.

12. The method of claim 10, wherein the first thermocouple wire and the second thermocouple wire have a diameter between about 5 micrometres and about 100 micrometres.

13. The method of claim 10, wherein the at least one susceptor comprises a thermal insulator arranged for thermally insulating the at least one susceptor from the first thermocouple wire and the second thermocouple wire.

14. The method of claim 10, wherein the first thermocouple wire comprises chromel and the second thermocouple wire comprises alumel.

15. The method of claim 10, wherein the first thermocouple wire is surrounded by a first electrical insulation layer and the second thermocouple wire is surrounded by a second electrical insulation layer, the first and the second electrical insulation layers having a thickness between about 2 micrometres and about 10 micrometres.

16. The method of claim 15, wherein the first electrical insulation layer and the second electrical insulation layer comprise parylene.

17. An inductive heating arrangement, comprising:
a cavity configured to receive an aerosol-forming substrate heatable by the inductive heating arrangement;
at least one inductor coil configured to generate a varying magnetic field when a varying electric current flows through the at least one inductor coil;
at least one susceptor arranged relative to the at least one inductor coil such that the at least one susceptor is heatable by penetration of the varying magnetic field, the at least one susceptor being configured to heat the aerosol-forming substrate; and
a thermocouple comprising a first thermocouple wire and a second thermocouple wire, the first thermocouple wire extending from a first proximal end to a first distal end, the second thermocouple wire extending from a second proximal end to a second distal end, the first proximal end being joined to the second proximal end, thus forming a joint, the joint being in thermal contact with the at least one susceptor,
wherein the first thermocouple wire and the second thermocouple wire have a diameter between about 5 micrometres and about 100 micrometres.

18. The inductive heating arrangement of claim 17, wherein the first thermocouple wire comprises chromel and the second thermocouple wire comprises alumel.

19. The inductive heating arrangement of claim 17, wherein the first thermocouple wire is surrounded by a first electrical insulation layer and the second thermocouple wire is surrounded by a second electrical insulation layer, the first and the second electrical insulation layers having a thickness between about 2 micrometres and about 10 micrometres.

20. The inductive heating arrangement of claim 19, wherein the first electrical insulation layer and the second electrical insulation layer comprise parylene.

21. The inductive heating arrangement of claim 17, wherein the at least one susceptor is a tubular susceptor.

22. The inductive heating arrangement of claim 21, wherein the tubular susceptor at least partially defines the cavity configured to receive the aerosol-forming substrate.

23. The inductive heating arrangement of claim 21, wherein the tubular susceptor comprises a tubular support body and a susceptor layer provided on an internal surface of the tubular support body.

24. An aerosol-generating device, comprising:
the inductive heating arrangement of claim 17;
a device housing defining the cavity; and
a power supply electrically connected to the inductive heating arrangement and configured to provide a varying electric current to the at least one inductor coil.

25. An aerosol-generating system, comprising:
the aerosol-generating device of claim 24; and
an aerosol-generating article comprising the aerosol-forming substrate.

* * * * *